US 6,709,578 B2

(12) United States Patent  (10) Patent No.: US 6,709,578 B2
Wilcher  (45) Date of Patent: Mar. 23, 2004

(54) TILT-OUT FRAME FOR A FILTER SCREEN

(75) Inventor: Stephen B. Wilcher, Harleysville, PA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 10/001,927

(22) Filed: Oct. 31, 2001

(65) Prior Publication Data

US 2003/0080035 A1 May 1, 2003

(51) Int. Cl.[7] .................................. B01D 33/056
(52) U.S. Cl. ................. 210/158; 210/160; 210/232; 210/400
(58) Field of Search .................. 210/158, 160, 210/170, 232, 400, 401, 499

(56) References Cited

U.S. PATENT DOCUMENTS

| 1,967,050 A | * | 7/1934 | Brachett ............... 210/160 |
| 2,095,504 A | * | 10/1937 | Kesti et al. ........... 210/160 |
| 2,286,332 A | * | 6/1942 | Bleyer ................. 210/160 |
| 3,980,560 A |   | 9/1976 | Eades |
| 4,265,742 A | * | 5/1981 | Bucker et al. .......... 200/309 |
| 5,000,846 A |   | 3/1991 | Dietrick et al. |
| 5,180,488 A |   | 1/1993 | Dietrick et al. |
| 5,242,583 A | * | 9/1993 | Thomas ............... 220/232 |
| 5,326,460 A | * | 7/1994 | Cheesman et al. ...... 210/160 |
| 5,397,462 A |   | 3/1995 | Higashijima et al. |
| 5,595,654 A |   | 1/1997 | Caughman, Jr. |
| 5,618,415 A | * | 4/1997 | Johnson, Jr. ............ 210/400 |
| 5,681,460 A |   | 10/1997 | Caughman, Jr. |
| 6,267,880 B1 | * | 7/2001 | Jackson ............... 210/160 |

* cited by examiner

Primary Examiner—Christopher Upton
(74) Attorney, Agent, or Firm—Michael Best & Friedrich LLP

(57) ABSTRACT

A filter screen that is used in filtering water and that includes a frame and a grid assembly that is supported by the frame for movement. The grid assembly includes a continuous unbroken drive chain having a guide link, and a screen panel. The screen panel is coupled to the guide link for selective movement between an operating condition and a maintenance condition. When the screen panel is in the operating condition the screen panel is fixed relative to the guide link for movement with the guide link and for filtering water. In the maintenance condition, the screen panel is pivotable relative to the guide link to permit access to the interior of the filter screen for inspection of chain components.

14 Claims, 4 Drawing Sheets

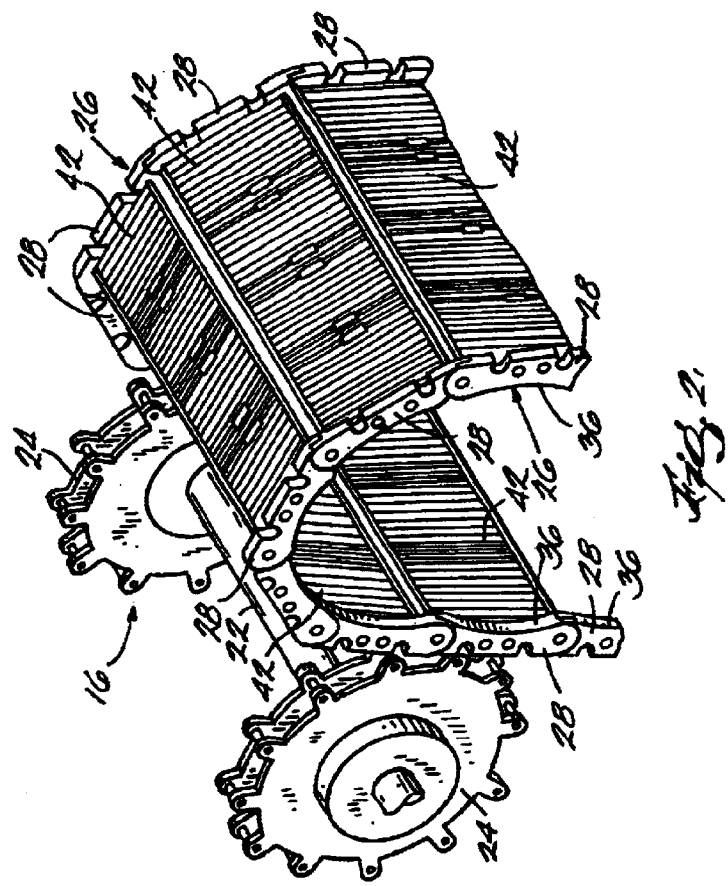
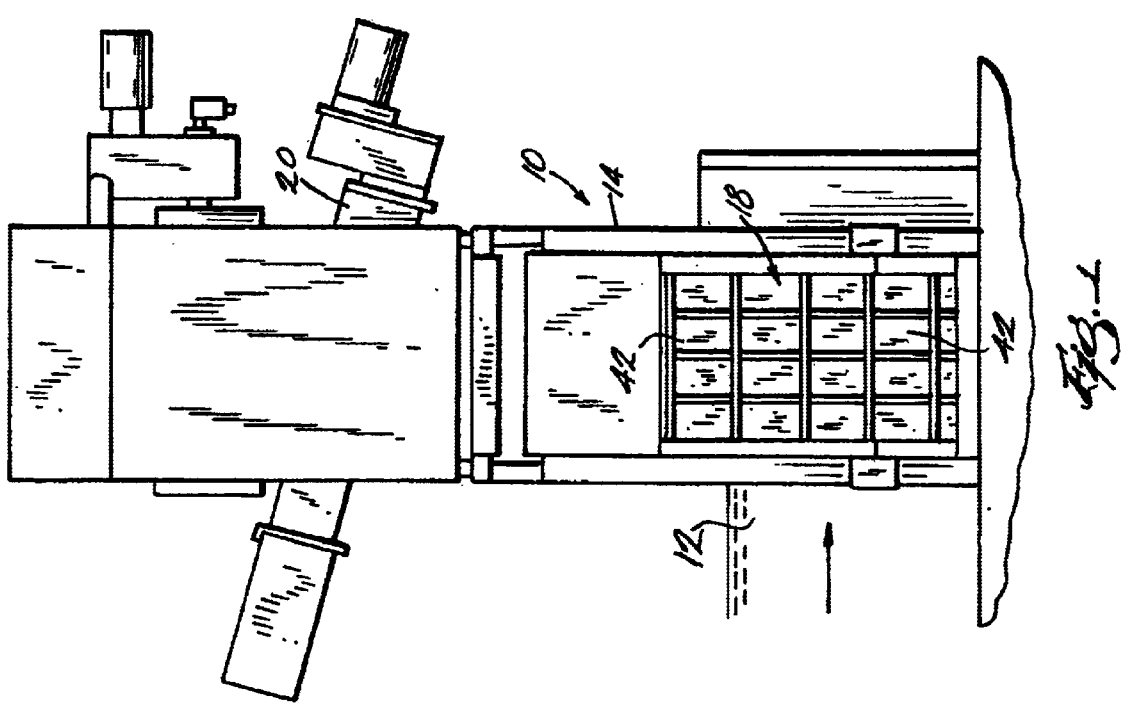

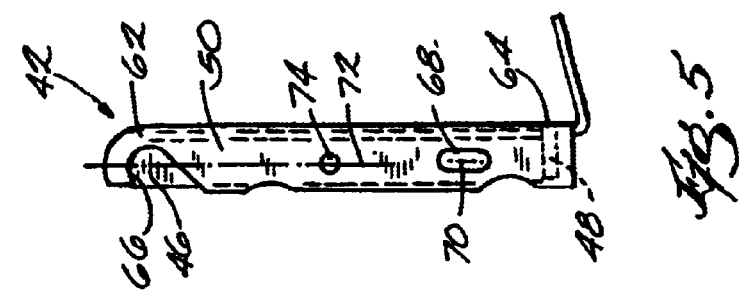
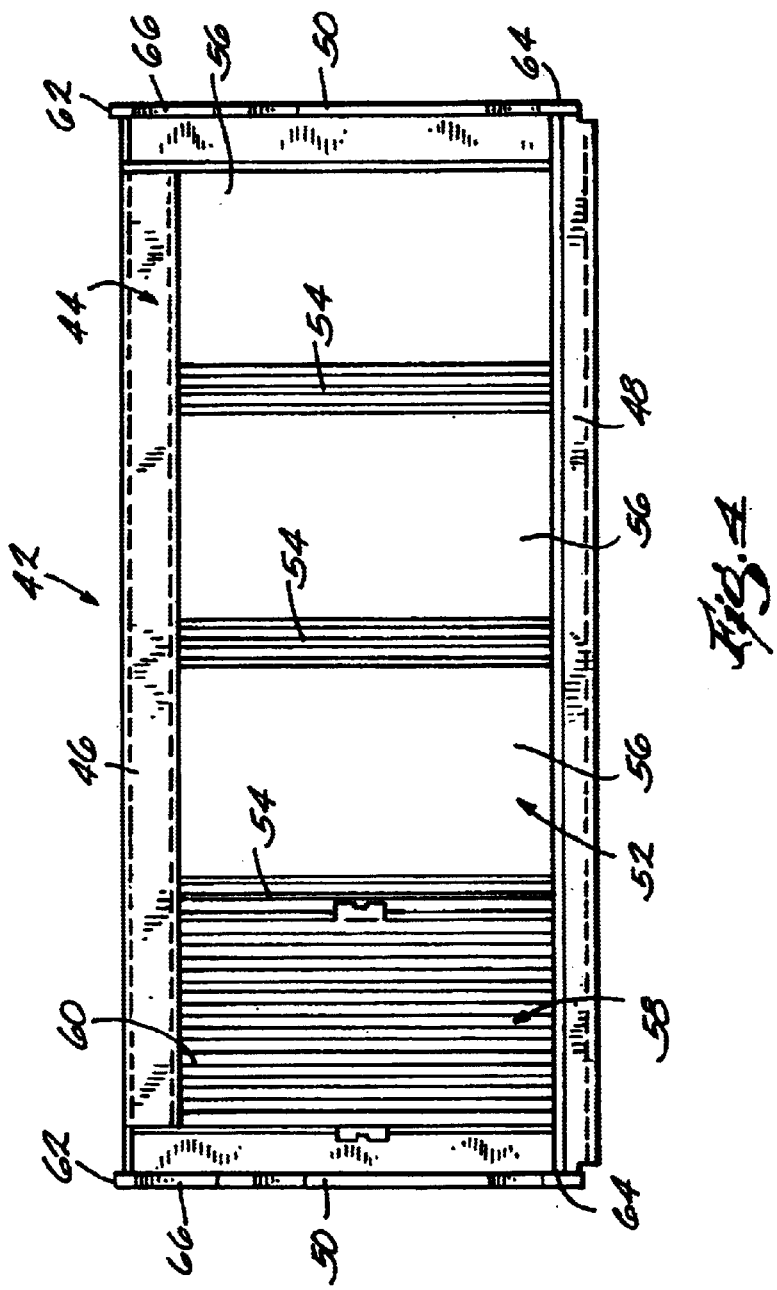

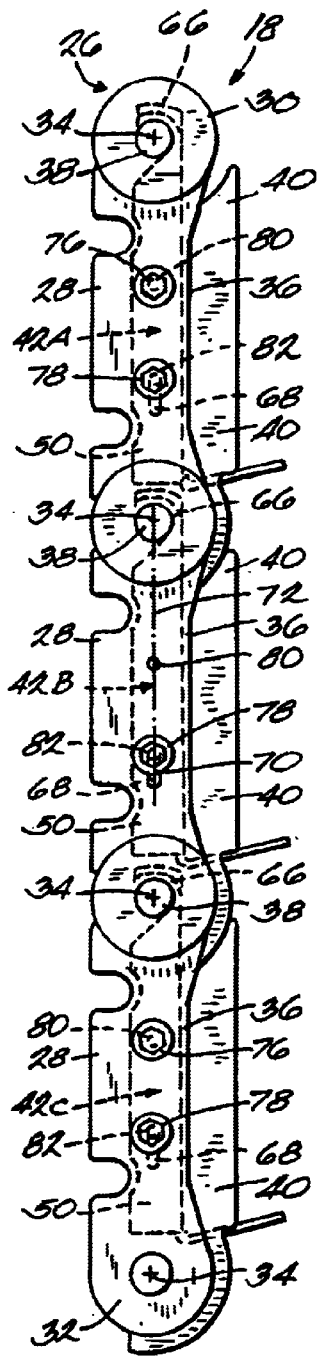

TILT-OUT FRAME FOR A FILTER SCREEN

FIELD OF THE INVENTION

The invention relates to filter screens, and more particularly to filter screens having screen panels.

BACKGROUND OF THE INVENTION

Wastewater and water treatment plants utilize filter screens to remove harmful debris from channeled water. The filter screen is typically utilized in the first area to come in contact with the channeled water. In order to protect downstream equipment and processes, the filter screen removes debris before it comes into contact with any downstream equipment.

One type of filter screen includes a grid assembly and a drive system to move and rotate the grid assembly. The drive system includes an endless chain, and a plurality of screen panels that are connected to the chain. The screen panels generally include a frame and filter inserts that are supported by the frame.

The movement of the chain and screen panels result in wear of the chain and its components. Prior art screens do not facilitate inspection of the chain and its components. The prior art designs require that the chain and screen panel assemblies be completely disassembled from the chain and removed from the filter screen for either inspection or replacement of chain components. In the prior art arrangements, when the frames and chains are disassembled, the chain becomes unsupported and clamps are required to hold all the components in place while the inspection or the replacement of chain components takes place.

The filter screens remove debris from the water when the water is channeled from the interior of the grid assembly to the exterior of the grid assembly through the bottom and sides of the grid assembly. Debris commonly becomes trapped on the interior side of the filter screens and must be manually removed to ensure proper operation. Known grid assemblies do not facilitate access to the interior of the grid assembly. These designs require the chain to be separated and the filter screen to be removed to gain access to the interior of the grid assembly for the removal of trapped debris.

SUMMARY OF THE INVENTION

The present invention is directed to a filter screen that simplifies inspection and maintenance of the grid assembly by providing pivoting screen panels. The screen panels are coupled to the chain for selective pivoting movement such that the screen panel can be pivoted relative to the chain for repair and/or inspection without completely removing the screen panels from the chain. The screen panels also provide access to the chain components and the interior of the grid assembly while maintaining continuous connection of the chain.

One embodiment of the present invention is directed to a filter screen for use in filtering water. The filter screen includes a frame and a grid assembly that is supported by the frame for movement. The grid assembly includes a continuous unbroken drive chain having a guide link, and a screen panel. The screen panel is coupled to the guide link for selective movement between an operating condition and a maintenance condition. When the screen panel is in the operating condition the screen panel is fixed relative to the guide link for movement with the guide link for filtering water. In the maintenance condition, the screen panel is pivotable relative to the guide link to permit access to the interior of the filter screen for inspection of chain components.

Another embodiment of the invention is directed to a grid assembly for use in a filter screen to filter water. The grid assembly includes a continuous unbroken drive chain having a guide link, and a screen panel. The screen panel is coupled to the guide link for selective movement between an operating condition and a maintenance condition. When the screen panel is in the operating condition the screen panel is fixed relative to the guide link for movement with the guide link and for filtering water. In the maintenance condition, the screen panel is pivotable relative to the guide link to permit access to the interior of the filter screen for inspection of chain components.

Other features and advantages of the invention will become apparent to those skilled in the art upon review of the following detailed description, claims, and drawings.

BRIEF DESCRIPTION OF THE DRAWINGS

FIG. 1 is a side elevation view illustrating a filter screen embodying the present invention.

FIG. 2 is a perspective view illustrating a drive system and a grid assembly of the filter screen shown in FIG. 1.

FIG. 4 is a front view illustrating the screen panel shown in FIG. 3.

FIG. 5 is a side view illustrating the screen panel shown in FIG. 4.

FIGS. 6–8 are side views of a portion of the grid assembly shown in FIG. 2, illustrating the conversion of the screen panel from the an operating condition to the maintenance condition.

Figure 3:
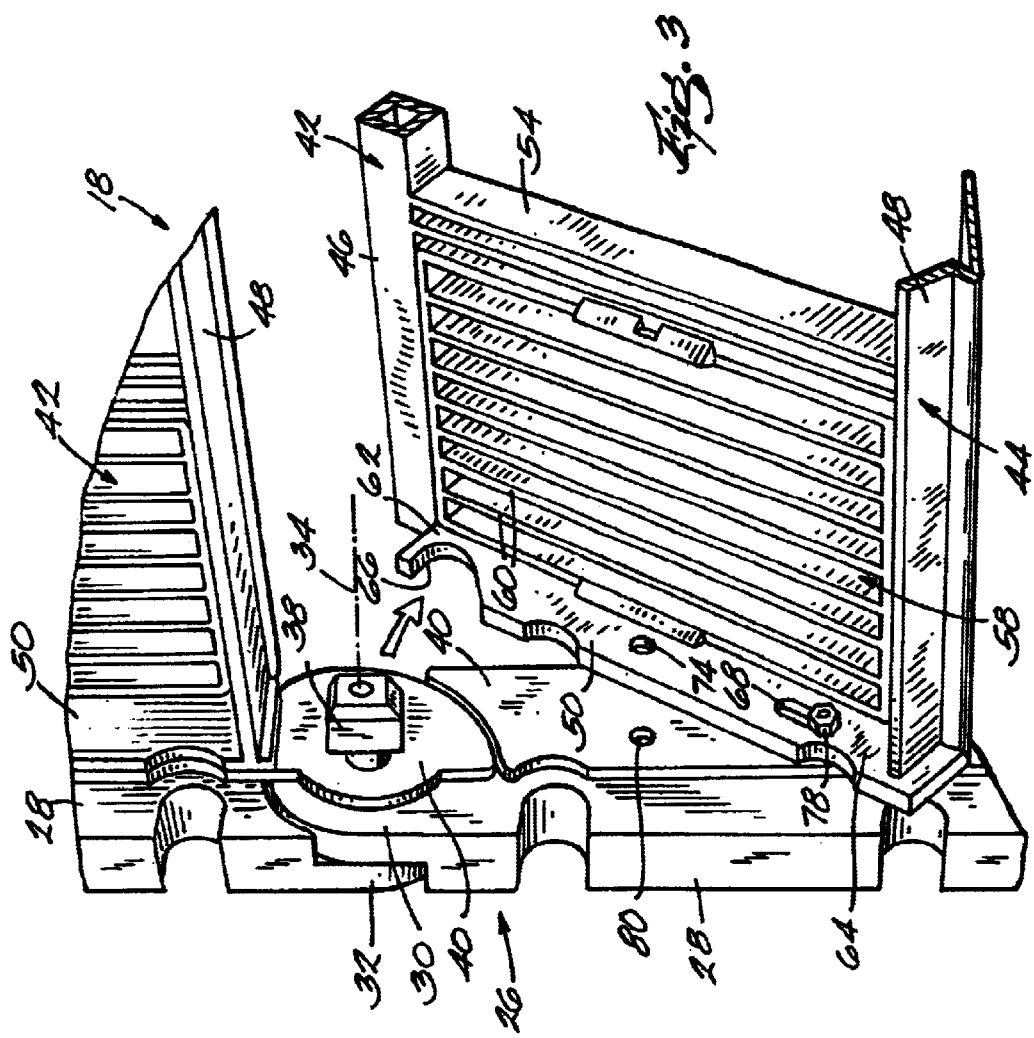
FIG. 3 is a perspective view of the grid assembly shown in FIG. 2, illustrating a screen panel in a maintenance condition.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a continuous self-cleaning filter screen 10 that is used in wastewater and water treatment plants to remove debris that is contained in channeled water 12. In order to protect downstream equipment processes, the filter screen 10 is designed to remove a large majority of the debris before it comes into contact with any downstream equipment. With further reference to FIG. 2, the filter screen 10 includes a frame 14, a drive system 16 rotatably mounted to the frame 14, and a grid assembly 18 that is driven by the drive system 16.

The filter screen 10 provides for flow of the channeled water 12 into the center of the grid assembly 18 and then exit out the bottom and sides of the grid assembly 18. The filter screen 10 removes the debris from the channeled water 12, and also dewaters and compacts the removed debris with an integral screw compactor 20.

The drive system 16 includes a drive shaft 22 and first and second drive sprockets 24 coupled for rotation with the drive shaft 22. The drive sprockets 24 engage the grid assembly 18 such that rotation of the drive shaft 22 by a motor (not shown) causes the drive sprockets 24 to move and rotate the grid assembly 18.

The grid assembly 18 includes first and second continuous drive chains 26. Each drive chain 26 includes a corresponding plurality of interconnected non-metallic guide links 28. Each guide link 28 includes a first portion 30 and an opposite second portion 32. The first portion 30 of each guide link 28 is rotatably coupled to a second portion 32 of an adjacent guide link 28 about a moveable pivot axis 34 to form an enclosed loop. Each guide link 28 includes a bearing surface 36 that engages a tracking system (not shown) of the frame 14 such that the bearing surfaces 36 of the guide links 28 slide around the tracking system as the drive chain 26 is moved by the drive sprocket 24. The grid assembly 18 also includes wear bushings 38 that are each centered about a respective pivot axis 34 and that project inwardly from the guide links 28 (FIG. 3).

As best shown in FIG. 3, each drive chain 26 also includes seal plates 40 that are coupled to the inside of the guide links 28. Each seal plate 40 is coupled to a respective guide link 28 such that the seal plate 40 rotates with the guide link 28 relative to the adjacent guide link 28 about the pivot axis 34. Each seal plate 40 projects past the bearing surface 36 of the respective guide link 28 to prevent outward lateral movement of the drive chain 26. The seal plates 40 on both drive chains 26 combine to maintain the drive chains 26 on the tracking system of the frame 14.

Referring again to FIG. 2, the grid assembly 18 includes a plurality of screen panels 42 that corresponds to the number of guide links 28. With additional reference to FIG. 4, each screen panel 42 includes a frame 44 having an upper member 46, a lower member 48, and end members 50 that connect the ends of the upper and lower members 46, 48. The frame 44 is preferably metallic and defines an enclosed space 52. The frame 44 includes a plurality of cross members 54 within the enclosed space 52 that connect the upper and lower members 46, 48 at intermediate locations along the upper and lower members 46, 48. The plurality of cross members 54 divide the enclosed space 52 of the frame 44 into four equally-sized sections 56.

An insert panel 58 is supported within each of the sections 56 to filter debris from the channeled water 12. The insert panels 58 are molded from a high strength plastic and are easily removed and replaced from the individual sections 56. The insert panels 58 include elongated filtering members 60 that are equally spaced from each other across the insert panel 58. When different filtering capabilities are required by the filter screen 10 the insert panels 58 are replaced with insert panels 58 that include different sized spacing between the filtering members 60.

The frame 44 of the screen panel 42 is not required to be fabricated from metal. Rather, the frame 44 can be made from a non-metallic material such as a high strength plastic without departing from the scope of the present invention. Additionally, the frame 44 and the insert panels 58 can be integrally molded as a single piece screen panel 42.

As best shown in FIG. 4, the end members 50 include a first portion 62 that is connected to the upper member 46 and a second portion 64 that is connected to the lower member 48. Each end member 50 includes a hook 66 that is adjacent to the first portion 62 and a slot 68 that is located near the second portion 64. The slot 68 includes a longitudinal axis 70 that is parallel to a longitudinal axis 72 of the end member 50. Each end member 50 also includes a hole 74 between the hook 66 and the slot 68.

FIG. 6 illustrates a portion of the grid assembly 18 with top, center, and bottom screen panels 42A, 42B, 42C in operating conditions. In the operating condition, the screen panels 42 are fixed relative to a respective guide link 28 for movement with the guide link 28 around the tracking system and for filtering contaminates from the channeled water 12. The end members 50 of the frames 44 are connected to the respective guide links 28 and seal plates 40 by first and second fasteners 76, 78 such that the hook 66 engages the bushing 38. The first fastener 76 extends through the hole 74 in the end member 50 and through a corresponding set of aligned holes 80 in the guide link 42 and seal plate 40. The second fastener 78 extends through the slot 68 in the end member 50 and through another set of aligned holes 82 in the guide link 28 and seal plate 40.

The conversion of the screen panel 42 from the operating condition to a maintenance condition will be described with reference to the center screen panel 42B in FIGS. 6–8. In the maintenance condition, the screen panel 42B is moveable relative to the guide link 28 and seal plate 40 to allow access to the bushings 38 for repair and replacement. As shown in FIG. 6, the first fastener 76 is removed from the guide link 28, the seal plate 40, and the end member 50. In addition, the second fastener 78 is loosened such that the screen panel 42B is free to move in the longitudinal direction of the end members 50.

As shown in FIG. 7, the screen panel 42B is raised relative to the guide link 28 and seal plate 40 such that the slot 68 moves relative to the loosened second fastener 78 and the hook 66 disengages from the bushing 38.

Referring to FIG. 8, after the screen panel 42B is raised and the hook 66 disengages from the bushing 38, the screen panel 42B is allowed to pivot relative to the guide link 28 and seal plate 40 about the second fastener 78.

Referring back to FIG. 3, when the screen panel 42 is located in the maintenance condition the bushings 38 are accessible for visually inspecting wear and for removing and replacing a worn bushing 38 or other chain components. In addition, when the screen panel 42 is in the maintenance condition, the drive chains 26 are not disconnected, and therefore no special equipment is necessary to maintain the drive chains 26 in continuous loops.

The screen panel 42 is returned to the operating condition from the maintenance condition by pivoting the screen panel 42 upward into alignment with the guide link 28 and the seal plate 40 such that the hook 66 re-engages the bushing 38. The first fastener 76 is then re-inserted into the hole 74 of the end member 50 and the holes 80 in the guide link 28 and the seal plate 40, and the first and second fasteners 76, 78 are tightened to fasten the screen panel 42 to the guide link 28 and seal plate 40.

What is claimed is:
1. A filter screen for use in filtering water, the filter screen comprising:
   a frame;
   a grid assembly supported by the frame for movement, the grid assembly including a continuous unbroken drive chain having a guide link, and a screen panel coupled to the guide link for selective movement with respect to the guide link between an operating condition where the screen panel is fixed relative to the guide link for movement with the guide link and for filtering water and a maintenance condition where the screen panel is pivotable relative to the guide link to permit access to the filter screen, wherein the screen panel includes an end member having a hook that engages the guide link in the operating condition and that disengages from the guide link in the maintenance condition, and wherein the screen panel is linearly movable relative to the guide link to disengage the hook from the guide link in the maintenance condition.

2. The filter screen of claim 1, wherein the grid assembly further includes an additional continuous unbroken drive chain having a guide link, wherein the screen panel is coupled to the guide link of the additional drive chain for selective movement between the operating condition where the screen panel is fixed relative to the guide link of the additional drive chain for movement with the guide link of the additional drive chain and for filtering water and the maintenance condition where the screen panel is pivotable relative to the guide link of the additional drive chain to permit access to the filter screen.

3. The filter screen of claim 1, wherein the guide link includes a projection, and wherein the end member includes a slot having a longitudinal axis, the projection being positioned within the slot such that the screen panel pivots about the projection and moves linearly along the slot axis in the maintenance condition.

4. The filter screen of claim 3, wherein the guide link includes a hole, and wherein the projection is a fastener positioned in the hole of the guide link.

5. The filter screen of claim 3, further comprising a fastener that couples the guide link and the screen panel together in the operating condition.

6. The filter screen of claim 5, wherein the guide link includes a hole, and the end member includes a hole, the fastener being positioned in the hole of the guide link and the hole of the end member in the operating condition.

7. The filter screen of claim 6, wherein the hole of the end member is positioned between the slot and the hook.

8. A grid assembly for use in a filter screen to filter water, the grid assembly comprising:

a continuous unbroken drive chain including a guide link;

a screen panel coupled to the guide link for selective movement with respect to the guide link between an operating condition where the screen panel is fixed relative to the guide link for movement with the guide link and for filtering water and a maintenance condition where the screen panel is pivotable relative to the guide link to permit access to the filter screen, wherein the screen panel includes an end member having a hook that engages the guide link in the operating condition and that disengages from the guide link in the maintenance condition, and wherein the screen panel is linearly movable relative to the guide link to disengage the hook from the guide link in the maintenance condition.

9. The grid assembly of claim 8, further comprising an additional continuous unbroken drive chain including a guide link, wherein the screen panel is coupled to the guide link of the additional drive chain for selective movement between the operating condition where the screen panel is fixed relative to the guide link of the additional drive chain for movement with the guide link of the additional drive chain and for filtering water and the maintenance condition where the screen panel is pivotable relative to the guide link of the additional drive chain to permit access to the filter screen.

10. The grid assembly of claim 10, wherein the guide link includes a projection, and wherein the end member includes a slot having a longitudinal axis, the projection being positioned within the slot such that the screen panel pivots about the projection and moves linearly along the slot axis in the maintenance condition.

11. The grid assembly of claim 10, wherein the guide link includes a hole, and wherein the projection is a fastener positioned in the hole of the guide link.

12. The grid assembly of claim 10, further comprising a fastener that couples the guide link and the screen panel together in the operating condition.

13. The grid assembly of claim 12, wherein the guide link includes a hole, and the end member includes a hole, the fastener being positioned in the hole of the guide link and the hole of the end member in the operating condition.

14. The grid assembly of claim 13, wherein the hole of the end member is positioned between the slot and the hook.

* * * * *

UNITED STATES PATENT AND TRADEMARK OFFICE
CERTIFICATE OF CORRECTION

PATENT NO. : 6,709,578 B2
DATED : March 23, 2004
INVENTOR(S) : Stephen B. Wilcher It is certified that error appears in the above-identified patent and that said Letters Patent is hereby corrected as shown below:

Column 6,
Line 28, Claim 10, should read:
The grid assembly of claim 8, wherein the guide link includes a projection, and wherein the end member includes a slot having a longitudinal axis, the projection being positioned within the slot such that the screen panel pivots about the projection and moves linearly along the slot axis in the maintenance condition.

Signed and Sealed this

Ninth Day of November, 2004

JON W. DUDAS
*Director of the United States Patent and Trademark Office*